United States Patent [19]

Yamamoto et al.

[11] 4,385,682

[45] May 31, 1983

[54] MOTOR VEHICLE CLUTCH FACING AND FRICTION PROPERTY MODIFIER THEREFOR

[75] Inventors: Yasunobu Yamamoto, Chiryu; Toshiaki Sakabe, Toyota; Eiji Hamada, Hanada, all of Japan

[73] Assignees: Aisin Seiki Company, Limited; Aisin Kako Kabushiki Kaisha, both of Kariya, Japan

[21] Appl. No.: 201,368

[22] Filed: Oct. 27, 1980

[30] Foreign Application Priority Data

Oct. 26, 1979 [JP] Japan .............................. 54-139013

[51] Int. Cl.$^3$ ............................................. F16D 69/02
[52] U.S. Cl. ................................ 192/107 M; 264/137; 528/3
[58] Field of Search ..................... 192/107 M; 528/3; 264/136, 137; 428/37

[56] References Cited

U.S. PATENT DOCUMENTS

| | | | |
|---|---|---|---|
| 2,134,324 | 10/1938 | Brackett | 264/137 X |
| 2,165,140 | 7/1939 | Harvey | 192/107 M X |
| 2,460,255 | 1/1949 | Harvey | 528/3 X |
| 2,460,256 | 1/1949 | Harvey | 528/3 X |
| 2,553,698 | 5/1951 | Brahs | 264/137 |
| 2,676,126 | 4/1954 | Walters et al. | 192/107 M X |
| 2,767,150 | 10/1956 | Harvey | 528/3 X |
| 3,647,722 | 3/1972 | Albertson et al. | 192/107 M X |
| 4,014,828 | 3/1977 | Thorpe | 192/107 M X |
| 4,197,352 | 4/1980 | Emmett et al. | 192/107 M X |
| 4,244,994 | 1/1981 | Trainor et al. | 192/107 M X |
| 4,280,935 | 7/1981 | Ogiwara | 192/107 M X |

OTHER PUBLICATIONS

"Cashew Friction Dusts", *Automobile Engineer*, Sep. 1955, p. 365.

*Primary Examiner*—Rodney H. Bonck
*Attorney, Agent, or Firm*—Oblon, Fisher, Spivak, McClelland & Maier

[57] ABSTRACT

Improved clutch facings for use in motor vehicles containing asbestos fibers, an improved friction property modifier comprising a cashew nutshell resin dust having graphite powder integrally incorporated therein, and a binder.

20 Claims, No Drawings

MOTOR VEHICLE CLUTCH FACING AND FRICTION PROPERTY MODIFIER THEREFOR

BACKGROUND OF THE INVENTION

1. Field of the Invention

This invention relates to an improved clutch facing, and more particularly to a clutch facing of the type used in motor vehicles. The invention also relates to an improved process for producing clutch facings of this type and to improved property modifiers for use therein.

2. Description of the Prior Art

Clutch facings of the type used in motor vehicles are generally composed of friction materials which comprise a relatively large porportion of asbestos fiber, together with other materials known as property modifiers which are added to provide desired levels of friction, wear, noise, and other properties of the friction material, and a resin binder which binds the other ingredients together as a single shaped article. Particular property modifiers include cured resinous friction dust derived from cashew nutshell liquid, ground rubber, and various carbonaceous materials such as carbon black, petroleum coke flour, and graphite. A common type of clutch facing for use in automobiles is prepared from asbestos fibers, cashew resin friction dust, graphite, and an organic resin binder.

Clutch facings for automobile use are generally prepared by the following process:

(1) An asbestos cord is prepared by spinning asbestos fibers about a fine brass wire which serves as a core. The friction property modifiers are incorporated into the spun asbestos cord as it is prepared.

(2) The asbestos cord is soaked in a binder such as a thermosetting phenolic resin.

(3) The resin-impregnated cord is dried.

(4) A green or uncured clutch face is then formed by placing strands of the asbestos cord side-by-side to form a sheet of the desired shape. This is often done simply by winding the asbetos cord in a tight spiral pattern on a flat surface.

(5) The uncured clutch face is then molded under heat and pressure to cure the clutch face in the desired shape. The molded clutch face is then cooled.

(6) The surface of the cured clutch facing is then ground smooth to produce a finished clutch facing.

The friction property modifiers most commonly used in automobile clutch facings are cashew resin friction dust and graphite. The combination of these two friction property modifiers has been found to produce especially good results in clutch facings of this type. These modifiers are incorporated into the asbestos cord when it is spun. However, the incorporation of the graphite into the asbestos cord at this step in the process has been founsd to present some problems. Since the graphite is in the form of a very finely divided and very light powder, it is difficult to keep it properly contained while being mixed with the asbestos fiber. This causes severe environmental problems in the factory, on the one hand, and on the other leads to an asbestos cord which may not contain the proper amount of graphite powder, and a clutch facing which, accordingly, does not have the desired properties.

In order to overcome this problem, an improved method has been proposed wherein a suitable amount of graphite powder is incorporated in the liquid uncured binder, and the asbestos fiber cord is soaked in this liquid binder. However, the clutch facings prepared using this impregnated asbestos cord have not been entirely satisfactory. The problems arise because the graphite powder is not uniformly incorporated into the asbestos fiber cord, but rather is concentrated on its surface. This results in a poor bond between cords which allows adjacent cords to be easily peeled apart. This peeling of adjacent cords is considered to be a very serious defect in a clutch facing.

Accordingly, a need has continued to exist for a clutch facing having a graphite friction property modifier uniformly distributed throughout, which is free of the problems of peeling of adjacent cords, and which can be manufactured by a process which avoids the environmental problems of incorporating graphite powder into the spun asbestos cord.

SUMMARY OF THE INVENTION

Accordingly, it is an object of the invention to provide an improved clutch facing.

A further object is to provide an improved clutch facing having a uniform distribution of the graphite and cashew nut shell resin friction dust.

Another object is to provide a clutch facing which is less susceptible to the problem of peeling of adjacent fiber cords.

A further object is to provide a process for manufacturing a clutch facing incorporating graphite friction property modifier, which process avoids the environmental problems of handling free graphite powder in the factory.

A further object is to provide an improved friction property modifier for use in motor vehicle clutch facings.

Further objects of the invention will become apparent from the description thereof which follows.

These objects of the invention have been achieved by providing an improved clutch facing containing cashew nutshell resin friction dust and graphite as friction property modifiers wherein the graphite is incorporated into the cashew nutshell resin friction dust.

According to the improved process of this invention, graphite is incorporated into the uncured cashew nutshell resin, the resin is cured, and the resin is subsequently ground into finely divided particles of cashew nutshell resinous friction dust incorporating graphite. This composite friction modifier dust is then incorporated into the asbestos cord as it is spun in the usual manner, and the asbestos cord so prepared is impregnated with a suitable binder, formed into a clutch facing, cured, and finished according to the process outlined above.

DETAILED DESCRIPTION OF THE PREFERRED EMBODIMENTS

The friction property modifier comprising a cashew nutshell resinous friction dust having graphite incorporated therein (hereinafter referred to as cashew-graphite friction dust) may be prepared by one of the following processes:

Method A

A cashew nutshell liquid is prepared from cashew nutshells by the customary methods known to those skilled in the art. To this cashew nutshell liquid is added formaldehyde and either acid or basic catalysts to produce a condensation reaction. The product of this condensation reaction is a liquid cashew nutshell resin.

Graphite powder is then blended uniformly with this liquid cashew nut shell resin. Additional formaldehyde and acid curing agent, or hexamethylenetetramine are then added to the mixture and the condensation reaction is continued at room temperature or, if necessary, at elevated temperatures, until a solid cashew nutshell resin having graphite incorporated therein is obtained. This solid resin so obtained is then pulverised to obtain the cashew-graphite resinous friction dust used in the clutch facings and process of this invention.

Mode B

The liquid cashew nutshell resin is prepared in the same way as in method A. Additional formaldehyde and acid catalyst curing agent or hexamethylenetetramine are then added and the condensation is completed at room temperature or at elevated temperature, if necessary, to obtain a solid cashew nutshell resin. This resin is then pulverized to obtain a cashew nutshell resin dust. Graphite powder is then blended into the cashew nutshell resin dust together with a particle-coating liquid such as a phenolic resin of the novolac type. The mixing is carried out, at elevated temperature if necessary, using a suitable mixing device such as a Henshel mixer, whereby a cashew-graphite friction dust is obtained which comprises the cashew resin dust coated with graphite powder.

In either of the cashew-graphite friction dusts prepared either by method A or method B, the cashew resin dust and the graphite are intimately combined with each other. In particular, the graphite powder cannot be dispersed from the mixture to contaminate the surroundings, and the proportion of graphite incorporated into the asbestos fiber cord will be definite and constant. In the cashew graphite friction dust of this invention, the proportion of graphite may be varied freely to obtain any desired properties in the clutch facings prepared therefrom. The proportion of graphite powder may range from 5-100 parts by weight per 100 parts by weight of the cashew resin dust. Preferably 5-60 parts by weight, and most preferably 5-40 parts by weight of the cashew-graphite friction dust are used, whether prepared by method A or method B.

In method B, the phenolic resin coating used to bind the graphite to the cashew resin friction dust may be used in any amount provided sufficient is present to adequately bind the graphite powder to the cashew resin friction dust.

The diameter of the particles of the cashew resin friction dust should be such that it can be smoothly combined with the asbestos fiber when the asbestos fiber cord is spun. Preferably the cashew resin dust has a diameter less than 350 $\mu$m (40 mesh).

The novel cashew-graphite friction dust according to this invention can be used in any method of manufacturing clutch facings. A preferred method is the so-called spiral wound procedure for preparing clutch facings of the type used in motor vehicles. This procedure comprises the following steps:

(1) An asbestos fiber cord is prepared in the usual fashion by spinning asbestos fibers together with the cashew-graphite friction dust and other optional ingredients around a fine brass wire cord.

(2) The asbestos fiber cord so prepared is soaked in a solution of a binder in a suitable volatile solvent, and subsequently dried.

(3) The impregnated cord is spiral-wound into the shape of a clutch face.

(4) The formed green clutch facing is molded and cured by the application of heat and pressure.

(5) The surface of the cured clutch facing is finished by grinding smooth.

The proportion of cashew-graphite friction dust used in preparing the clutch facings of this invention ranges from 5 to 50 parts by weight per 100 parts by weight of asbestos fiber, preferably 10 to 40 parts by weight per 100 parts by weight of asbestos fiber. Auxiliary ingredients can be incorporated in the proportion of 0-30 parts by weight per 100 parts by weight of the asbestos fiber, preferably 5-10 parts by weight. These auxiliary ingredients comprise lubricants, ingredients for improving the coefficient of friction, ingredients for improving the wear rate of the clutch facing, and the like. It will be understood by those skilled in the art that these auxiliary ingredients, which have various and sometimes contrary properties, are employed in suitable proportions to attain particular properties in the manufacture of clutch facings for applications having different specified requirements. Typical auxiliary ingredients include rubber dust, carbon fibers, various metal powders, and the like.

Having generally described the invention, a more complete understanding can be obtained by reference to certain specific examples, which are provided herein for purposes of illustration only and are not intended to be limiting unless otherwise specified.

REFERENCE EXAMPLE 1

Into a flask provided with a reflux condenser and a stirrer were charged 296 parts by weight of cashew nut shell liquid and 97 parts by weight of a 37% solution of formaldehyde in water. While the mixture was stirred, 2.1 parts by weight of a 20% aqueous solution of sodium hydroxide were added. With continuous agitation, the mixture was heated to 80° C. and held at that temperature for 3 hours. The water was then distilled off at a pressure of 65-70 cm of mercury while the temperature was maintained at about 75° C. The liquid cashew nutshell resin so obtained was then removed from the flask. This liquid resin had a viscosity of 1600 cp at 25° C. Then 100 parts by weight of the liquid cashew nut shell resin and 20 parts by weight of graphite powder were mixed together in a flask and while agitation was continued 15 parts by weight of paraformaldehyde containing 15% of water and 22% of benzensulfonic acid were added and the mixture was heated to a temperature of 120° C. The resin so obtained was then removed from the flask and pulverized to provide a cashew-graphite friction dust having a particle size of less than 150 $\mu$m (about 100 mesh).

REFERENCE EXAMPLE 2

Into a flask equipped with a reflux condenser and an agitator were charged 296 parts by weight of cashew nutshell liquid and 65 parts by weight of a 37% aqueous solution of formaldehyde. Under continuous agitation the mixture was heated to 80° C. Thereupon 2.1 parts by weight of oxalic acid were added and the temperature of the mixture was raised to the reflux temperature. This temperature was maintained for two hours with continuous agitation. After this time a 2-phase system was present in the flask; the aqueous upper phase was then removed. Subsequently, the condensation reaction was continued by removing water at 65-70 cm of mercury, while increasing the temperature gradually to 180° C. Thereupon, 96 parts by weight of methanol were added to obtain a liquid cashew nutshell resin. To this liquid resin were added 20 parts by weight of graphite powder, and 4.5 parts by weight of hexamethylenetetramine with continuous agitation, and the mixture was heated to a temperature of 140° C. While continuing agitation the mixture was maintained at a temperature of 140° C. until the condensation had proceeded to the extent that the resin was solid at room temperature. The mixture was then removed from the flask, cooled and solidified, and pulverized to a particle size of less than 150 μm.

REFERENCE EXAMPLE 3

A cashew nutshell resin powder having a particle size less than 100 mesh was prepared by the procedure of reference example 2, except that no graphite powder was added in the course of the synthesis. Then, 100 parts by weight of the cashew nutshell resin dust so obtained and 200 parts by weight of graphite powder were placed in a Henshel mixer, and 120 parts by weight of a phenolic resin mixture containing 35% methanol and 12% of hexamethylenetetramine were added thereto. This mixture was thoroughly blended to produce a cashew-graphite friction dust.

EXAMPLE 1

An asbestos fiber cord was prepared by spinning asbestos fiber, rayon fiber, and the cashew-graphite friction dust prepared in reference example 1. The asbestos fiber cord so prepared was then soaked in a 15% solution of a phenolic resin in methanol and subsequently dried by heating at 80° C. for 12 minutes. The impregnated cord so obtained was then wound into a circular shape on a standard winding machine, and the so-prepared green clutch facing was molded and cured using a metal mold in a compression molding machine at a temperature of 170° C. for 3 minutes under a pressure of 100 kg per square centimeter. The molded product was then heated at 150° C. for 12 hours, and subsequently cooled. This fully cured product was then finished by grinding the surface smooth to obtain a finished clutch facing.

EXAMPLE 2

A clutch facing was prepared by the same procedure as in Example 1, except that the cashew-graphite friction dust of reference example 2 was used in place of the cashew-graphite friction dust of reference example 1.

EXAMPLE 3

A clutch facing was prepared by the same procedure as in example 1 except that the cashew-graphite friction dust of reference example 3 was used in place of the cashew-graphite friction dust of reference example 1.

COMPARISON EXAMPLE

A clutch facing was prepared by the same procedure as in example 1 except that instead of the cashew-graphite friction dust of this invention, a cashew nutshell friction dust and graphite powder were separately incorporated into the asbestos cord.

A number of standard tests were conducted to demonstrate that the clutch facings of this invention prepared using the novel cashew-graphite friction dust have satisfactory properties for their intended use. The coefficient of friction and the wear ratio were measured on a full size dynamometer at a friction surface temperature of 200° C. The results of these tests are recorded in Table 1 below.

The susceptibility of the clutch facings of this invention to clutch chatter was determined by mounting an accelerometer on the floor of an automobile and recording the maximum value of the vibration generated when the automobile was set in motion with the clutch partially engaged. The average of the maximum values for 200 trials is recorded in Table 1.

The strength of the clutch facing was evaluated by determining the rotational velocity at which the clutch facing broke. These values are also recorded in Table 1 below.

The results tabulated in Table 1 illustrate that the objects of the invention are fully attained.

TABLE 1

| Tests/Tested Product | Example 1 | Example 2 | Example 3 | Comparison Example |
|---|---|---|---|---|
| Frictional coefficient Stable Period (μ) | 0.35 | 0.35 | 0.35 | 0.38 |
| Wear Ratio ($\times 10^{-8}$ mm/kg.m) | 4.60 | 4.65 | 4.70 | 6.00 |
| Resistance to Chatter ($C_T$) | 0.090 | 0.090 | 0.095 | 0.105 |
| Strength (rpm at break) | 15,500 | 15,500 | 15,000 | 14,500 |

Having now fully described the invention, it will be apparent to one of ordinary skill in the art that many changes and modifications can be made thereto without departing from the spirit or scope of the invention as set forth herein.

What is claimed as new and sought to be protected by Letters Patent of the United States is:

1. A cashew-graphite friction dust consisting essentially of a cashew nutshell resin having graphite powder integrally incorporated therein, wherein said cashew nutshell resin is in the form of a powder.

2. The cashew-graphite friction dust of claim 1, wherein the proportion of graphite powder is 5–100 parts by weight per 100 parts by weight of the cashew nutshell resin.

3. The cashew-graphite friction dust of claim 2, wherein the proportion of said graphite powder is 5–60 parts by weight per 100 parts by weight of said cashew nutshell resin.

4. The cashew-graphite friction dust of claim 3, wherein the proportion of said graphite powder is 5–40 parts by weight per 100 parts by weight of the cashew nutshell resin.

5. The cashew-graphite friction dust of claim 1, wherein the size of the particles in said friction dust is less than 350 μm.

6. The cashew-graphite friction dust of claim 1, wherein said graphite powder is incorporated into said cashew nut shell resin by polymerizing a cashew nutshell liquid resin in the presence of said graphite powder.

7. The cashew-graphite friction dust of claim 6, wherein said graphite powder is incorporated by a process comprising the steps of mixing cashew nutshell liquid with formaldehyde and conducting a condensation reaction using an acid or alkaline catalyst whereby a liquid cashew nutshell resin is obtained, mixing said graphite powder with said liquid cashew nutshell resin, adding formaldehyde and a curing agent to the mixture so obtained, curing said mixture whereby a solid cashew-graphite resin is obtained, and pulverizing said cashew-graphite resin.

8. The cashew-graphite friction dust of claim 1, wherein said graphite powder is incorporated by binding it to the surface of the particles of a cashew nutshell resin dust with a binder.

9. The cashew-graphite friction dust of claim 8, wherein said binder is a phenolic resin binder.

10. The cashew-graphite friction dust of claim 9, wherein said phenolic resin binder is a phenolic novolac binder.

11. A clutch facing comprising as asbestos fiber cord, the cashew-graphite friction dust of claim 1, and a binder.

12. A clutch facing comprising an asbestos fiber cord, the cashew-graphite friction dust of claim 2, and a binder.

13. A clutch facing comprising an asbestos cord, the cashew-graphite friction dust of claim 3, and a binder.

14. A clutch facing comprising an asbestos fiber cord, the cashew-graphite friction dust of claim 4, and a binder.

15. A clutch facing comprising an asbestos fiber cord, the cashew-graphite friction dust of claim 5, and a biner.

16. A clutch facing comprising an asbestos fiber cord, the cashew-graphite friction dust of claim 6, and a binder.

17. A clutch facing comprising an asbestos fiber cord, the cashew-graphite friction dust of claim 7, and a binder.

18. A clutch facing comprising an asbestos fiber cord, the cashew-graphite friction dust of claim 8, and a binder 19. A clutch facing comprising an asbestos fiber cord, the cashew-graphite friction dust of claim 9, and a binder.

20. A clutch facing comprising an asbestos fiber cord, the cashew-graphite friction dust of claim 10, and a binder.

* * * * *

UNITED STATES PATENT AND TRADEMARK OFFICE
CERTIFICATE OF CORRECTION

PATENT NO. : 4,385,682
DATED : May 31, 1983
INVENTOR(S) : Yasunobu Yamamoto, Toshiaki Sakabe and Eiji Hamada It is certified that error appears in the above-identified patent and that said Letters Patent is hereby corrected as shown below:

In column 1, line 15, "porportion" should read --proportion--;

In column 1, line 55, "founsd" should read --found--;

In column 7, line 12, "as" should read --an--;

In column 8, line 5, "biner" should read --binder--.

Signed and Sealed this

Sixth Day of December 1983

[SEAL]

Attest:

Attesting Officer

GERALD J. MOSSINGHOFF

Commissioner of Patents and Trademarks